(12) United States Patent
Rouleau

(10) Patent No.: US 6,550,146 B1
(45) Date of Patent: Apr. 22, 2003

(54) SIEVING LADLE

(76) Inventor: Luc Rouleau, 2925, Ste-Madeleine, St-Hyacinthe Québec (CA), J2T 2C3

( * ) Notice: Subject to any disclaimer, the term of this patent is extended or adjusted under 35 U.S.C. 154(b) by 0 days.

(21) Appl. No.: 09/619,694

(22) Filed: Jul. 19, 2000

(30) Foreign Application Priority Data

Jul. 20, 1999 (GB) .............................................. 9916845

(51) Int. Cl.[7] .............................................. A47J 43/28
(52) U.S. Cl. .......................................... 30/325; 30/326
(58) Field of Search .................. 30/325, 326; 210/470; D7/647, 667, 691, 692

(56) References Cited

U.S. PATENT DOCUMENTS

| | | | | |
|---|---|---|---|---|
| 1,053,780 A | * | 2/1913 | Brooks | 210/469 |
| 1,057,269 A | * | 3/1913 | Prestien | 210/470 |
| D60,109 S | * | 12/1921 | Rosen | D7/667 |
| 1,654,980 A | * | 1/1928 | Le Duc | 210/469 |
| 2,121,165 A | * | 6/1938 | Slobodkin | D7/570 |
| 2,258,058 A | * | 10/1941 | Johnson | 30/325 |
| 2,556,092 A | * | 6/1951 | Kimball | 30/124 |
| 2,572,524 A | * | 10/1951 | Schmeiler | 210/470 |
| D194,402 S | * | 1/1963 | Schlessel | 30/325 |
| 3,100,054 A | * | 8/1963 | Rubens | D7/587 |
| 4,040,185 A | * | 8/1977 | Jacobi | 210/474 |
| 4,839,965 A | * | 6/1989 | Levie | 30/324 |
| D325,327 S | * | 4/1992 | Tam et al. | D7/667 |
| 5,199,349 A | * | 4/1993 | Hansen | 210/470 |
| 5,367,775 A | * | 11/1994 | Tong et al. | 30/324 |

FOREIGN PATENT DOCUMENTS

| | | | |
|---|---|---|---|
| DE | 747054 | * | 9/1944 |
| FR | 1426017 | * | 12/1965 |
| GB | 8992 | * | 7/1908 |

* cited by examiner

Primary Examiner—Allan N. Shoap
Assistant Examiner—Stephen Choi

(57) ABSTRACT

A sieving ladle allowing separation of solids or coarse material from liquids or fine particles; the sieving ladle comprising a generally concave-shaped bowl, the bowl defining a bowl wall, the bowl wall having a bowl wall peripheral edge, the bowl wall peripheral edge defining an open main surface extending therebetween; a handle extending from the concave-shaped bowl; a sieving wall, the sieving wall defining a sieving wall proximal edge, a sieving wall distal edge, a sieving wall proximal segment and a sieving wall distal segment, the seeing wall proximal segment extending generally tangentially from a connecting section of the wall peripheral edge, the sieving wall having sieving apertures extending therethrough.

19 Claims, 4 Drawing Sheets

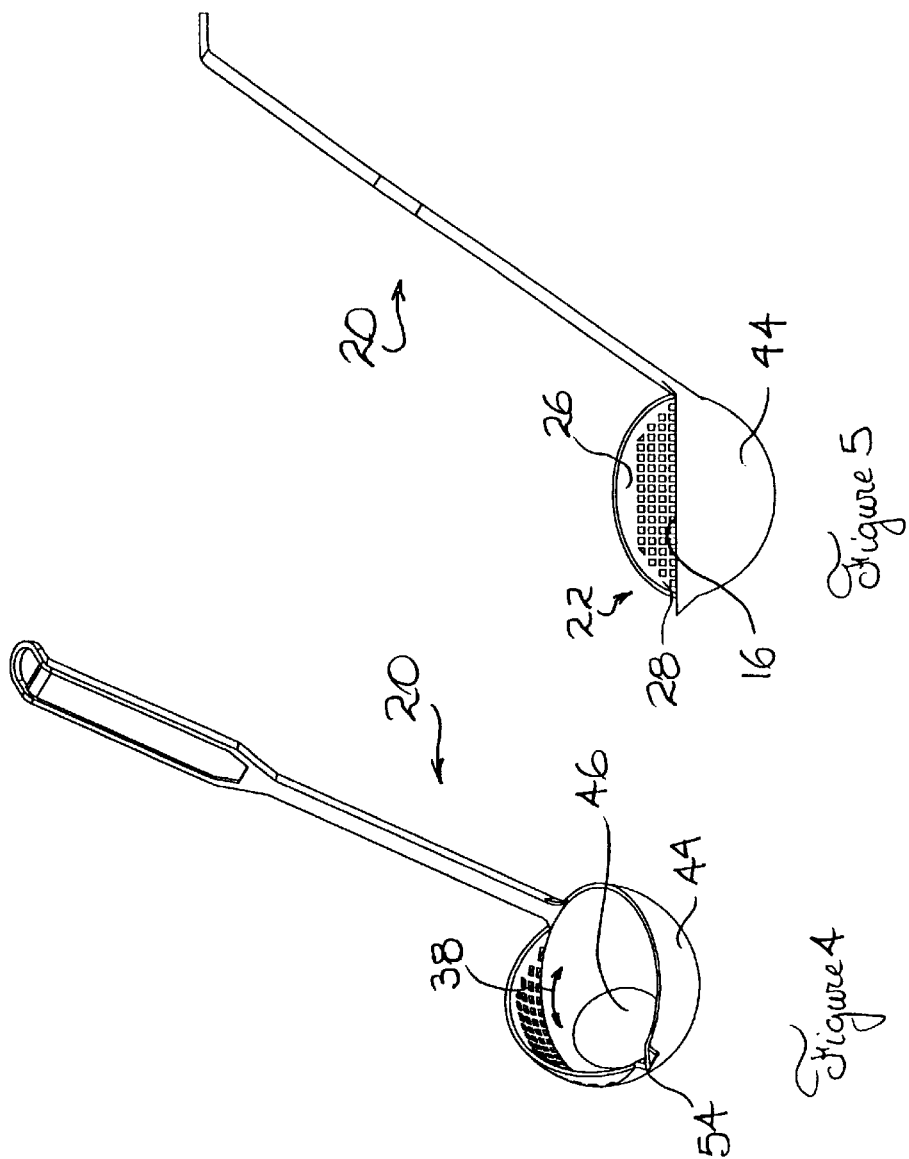
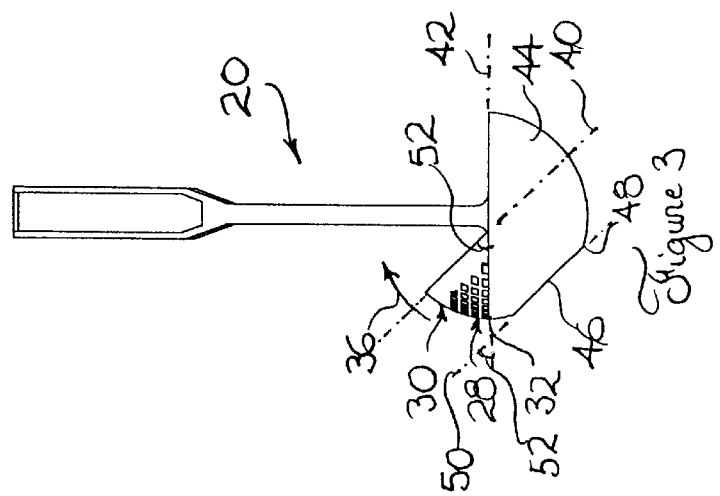

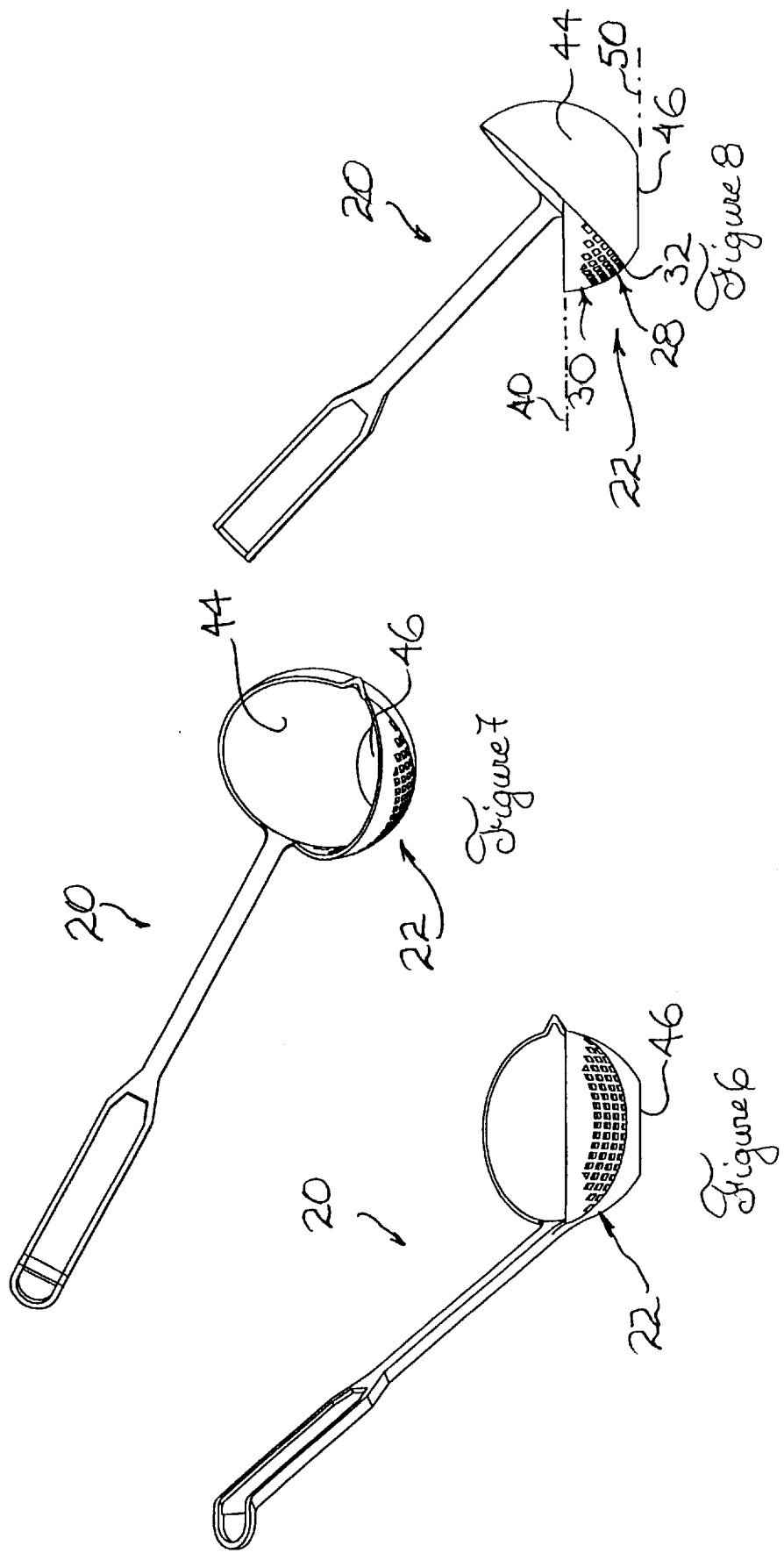

SIEVING LADLE

FIELD OF THE INVENTION

The present invention relates to the general field of cooking utensils and is particularly concerned with a sieving ladle.

BACKGROUND OF THE INVENTION

There exists a plurality of situations wherein it is desirable to separate solids or coarse particles from liquids or finer particles. Examples of such situations are commonly found in the cooking field. Typical examples of this include separating fat from a liquid, separating two different components of a liquid of different specific gravities, or separating a liquid from solid objects floating thereon. It is also often desirable to separate similar materials contained within a ladle, a spoon or the like.

The basic process of separating materials is typically by pouring the overlying material off which is often impractical or by scooping and/or skimming it off. For this purpose, spoons, cups and ladles have been proposed. Such maneuvers all depend on careful manipulations and usually require manual dexterity.

The traditional kitchen ladle is a deep-bowled long handled spoon for serving liquid, solid mixtures such as soups, gravy, stews or fruit punch. The ladle ensures that the liquid and solids portions of the mixture are served together. The conventional ladle is incapable of serving the liquid only or the solids only from the liquid-solid mixtures. Solids can be removed from a liquid-solid mixture by using a perforated strainer or spoon. The strainer is, however, incapable of serving the liquid only from the liquid-solid mixture. For example, with respect to fruit punches, most people would prefer not to have solids in their drinks. In other situations, for example, it may be necessary to serve only broth from soup or only solids such as eggs from an egg bath.

Separating devices have been proposed in the prior art but they suffer from major drawbacks including lack of ergonometric features and considerable complexity. Also, and most importantly, they are particularly not well adapted for allowing liquid-solid separations in and out of the ladle. In other words, while some prior art devices may allow separation of solids from liquids when the mixtures contained within the ladle bowl they are unsuited for allowing liquid-solid separation for mixtures located outside the ladle and that must be filtered within the latter.

Accordingly, there exists a need for an improved sieving ladle.

Advantages of the present invention include that the proposed sieving ladle can be used both as a regular ladle for serving liquid-solid mixtures and as a sieving implement allowing sieving of liquid-solid mixtures either into or out of the ladle bowl. The proposed sieving ladle thus allows an intended user not only to separate the liquid-solid mixture as it is being poured out of the ladle bowl with the solids remaining thereunto but also allows an intended user to separate a liquid-solid mixture located outside of the ladle bowl leaving the solids outside of the bowl and allowing the liquids to flow thereunto. The sieving ladle can thus be used both as a strainer and as a skimmer.

The sieving ladle is specifically configured so that when it is used in its strainer mode it ensures that the solids being filtered remain within the bowl even when the ladle is tilted considerably so as to allow easy flow of the liquid therefrom through the sieving portion of the ladle. Conversely, the proposed sieving ladle is configured so as to reduce the risks of having solid particles enter the bowl when the ladle is used in its skimmer mode. The specific configuration of the bowl, allows the ladle to be positioned in an angled relationship relative to the surface of the mixture being sieved with minimal bulging of the bowl into the mixture and thus reduced risks of unwanted mixture spillage into the bowl.

The proposed sieving ladle is provided with a set of ergonomic features adapted to facilitate handling thereof. Furthermore, its handle section is provided with a built-in hooking section for facilitating hooking of the sieving ladle both to the peripheral edge of cooking containers and to storage hooks when not in use.

The sieving ladle is optionally provided with integral relative sharp edges for allowing the implement to be used for other functions such as scraping or light cutting.

The sieving ladle is specifically configured so as to be manufacturable using conventional forms of manufacturing so as to provide a ladle which will be economically feasible, long lasting and relatively trouble free in operation.

SUMMARY OF THE INVENTION

In accordance with an embodiment of the invention, there is provided a sieving ladle for allowing separation of solids or coarse material from liquids or fine particles, the sieving ladle comprising a generally concave-shaped bowl, the bowl defining a bowl wall, the bowl wall having a bowl wall peripheral edge, the bowl wall peripheral edge defining an open main surface extending therebetween; a handle extending from the concave-shaped bowl; a sieving wall, the sieving wall defining a sieving wall proximal edge, a sieving wall distal edge, a sieving wall proximal segment and a sieving wall distal segment, the sieving wall proximal segment extending generally tangentially from a connecting section of the wall peripheral edge, the sieving wall having sieving apertures extending therethrough.

Preferably, the sieving wall is curved inwardly so that the sieving wall distal segment overlies the open main surface. Conveniently, the connecting section has a generally curved configuration so that the sieving wall proximal segment has a generally rounded configuration curved about two distinct curving axis.

Preferably, the sieving wall has the general configuration of a rounded symmetrical section of a sphere. Conveniently, the sieving wall distal edge lies in a first intersecting geometrical plane, the first intersecting geometrical plane being in an angled relationship relative to the open main surface.

Preferably, the bowl wall peripheral edge has a generally circular configuration. Conveniently, the bowl wall peripheral edge has a generally oval configuration. Preferably, the bowl wall defines a main bowl wall section and an auxiliary bowl wall section, the main bowl wall section having a generally dome-shaped configuration, the auxiliary bowl wall section having a generally flat configuration.

Conveniently, intersection between the main bowl wall section and the auxiliary bowl wall section, defines a relatively sharp intersection edge. Preferably, the main bowl wall section has a generally hemi-spherical configuration. Conveniently, the auxiliary bowl wall section is positioned generally proximal the connecting section.

Preferably, the auxiliary bowl wall section extends in a second intersecting geometrical plane, the second intersecting geometrical plane being in a generally parallel relationship with the first intersecting geometrical plane. Conveniently, the first and second intersecting geometrical planes both form a plane angle having a value substantially in the range of 45 degrees with the open main surface.

Preferably, the bowl peripheral edge defines a pouring spout, the pouring spout being positioned in a generally diametrically opposed relationship relative to the handle. Conveniently, the sieving wall proximal edge extends from a positioned adjacent the handle to a position adjacent the pouring spout. Preferably, the sieving wall proximal edge merges integrally with the connecting section.

Conveniently, the handle defines a proximal handle spacing segment extending from the bowl, a handle grasping segment extending integrally and distally from the handle spacing segment and a handle hooking segment extending integrally from a distal end of the handle grasping segment, the handle spacing segment extending generally tangentially from the bowl wall, the handle grasping segment extending generally in a coaxial relationship with the handle spacing segment and the handle hooking segment extending in a generally parallel relationship with the open main surface.

In accordance with the present invention, there is also provided a sieving ladle for allowing separation of solids or coarse material from liquids or fine particles, the sieving ladle comprising: a generally concave-shaped bowl, the bowl defining a bowl wall, the bowl wall having a bowl wall peripheral edge, the bowl wall peripheral edge defining an open main surface extending therebetween, the bowl wall defining a main bowl wall section and an auxiliary bowl wall section, the main bowl wall section having a generally dome-shaped configuration, the auxiliary bowl wall section having a generally flat configuration; a handle extending from the concave-shaped bowl; a sieving wall, the sieving wall having sieving apertures extending therethrough and extending integrally from the wall peripheral edge.

Preferably, the sieving wall has the general configuration of a rounded symmetrical section of a sphere, the sieving wall defining a sieving wall peripheral edge, the sieving wall peripheral edge extending in a first intersecting geometrical plane that intercepts the open main surface and is in an angled relationship relative thereto.

Conveniently, the auxiliary bowl wall section extends in a second intersecting geometrical plane the second intersecting geometrical plane being in a generally parallel relationship with the first intersecting geometrical plane.

BRIEF DESCRIPTION OF THE DRAWINGS:

An embodiment of the present invention will now be disclosed, by way of example, in reference to the following drawings in which:

FIG. 3: in a front elevational view, illustrates a sieving ladle in accordance with an embodiment of the present invention, the sieving ladle being shown with its main open section in a generally horizontal configuration.

FIG. 4: in a front perspective view, illustrates the sieving ladle shown in FIG. 3.

FIG. 5: in a side elevational view, illustrates the sieving ladle shown in FIGS. 3 and 4.

FIG. 6: in a side elevational view, illustrates the sieving ladle in accordance with an embodiment of the present invention. The sieving ladle being shown with its auxiliary bowl wall in a generally horizontal configuration.

FIG. 7: in a front perspective view, illustrates the sieving ladle shown in FIG. 6.

FIG. 8: in a front elevational view, illustrates the sieving ladle shown in FIGS. 6 and 7.

DETAILED DESCRIPTION OF THE DRAWINGS

Figure 1:
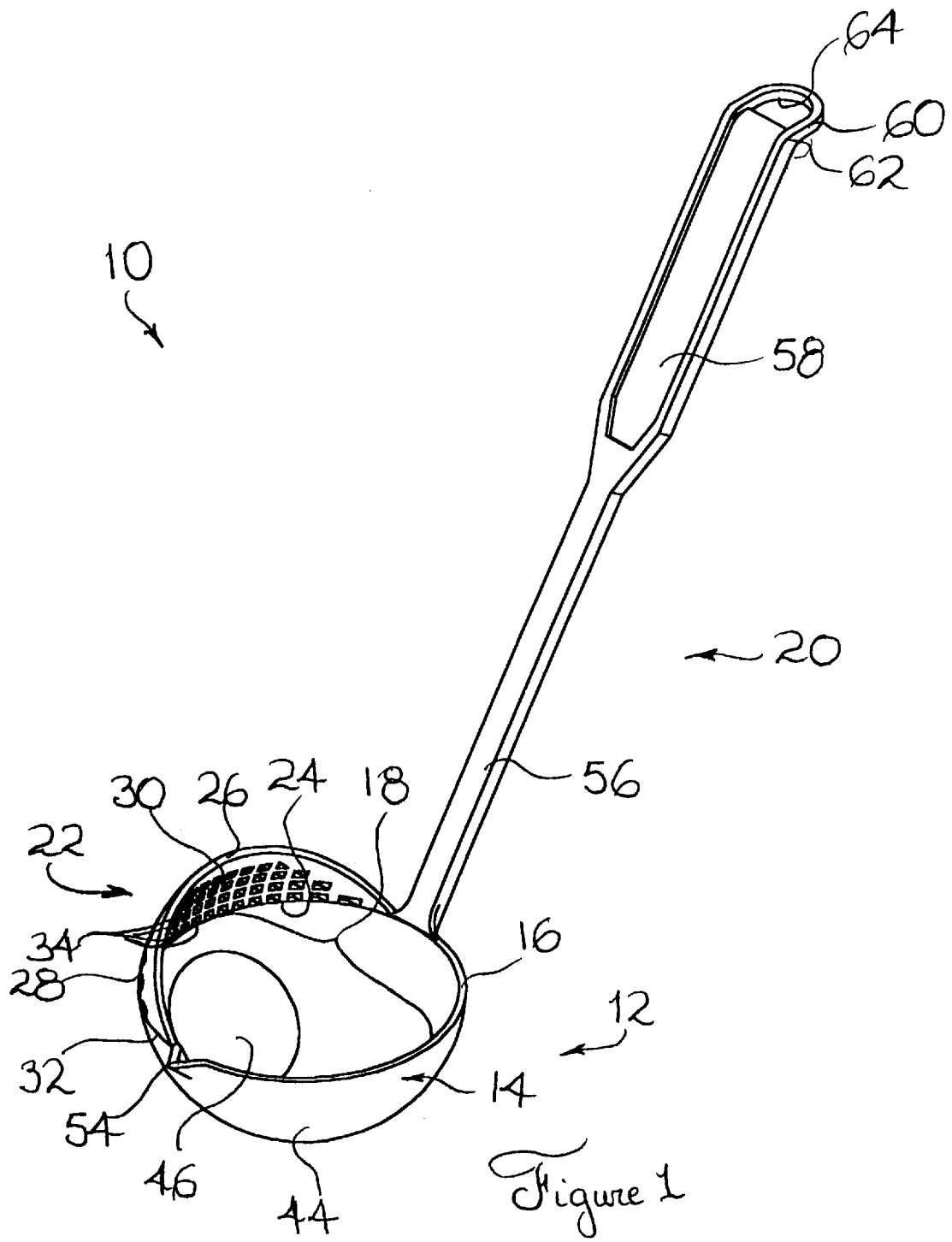
FIG. 1: in a front perspective view, illustrates a sieving ladle in accordance with an embodiment of the present invention.
Figure 2:
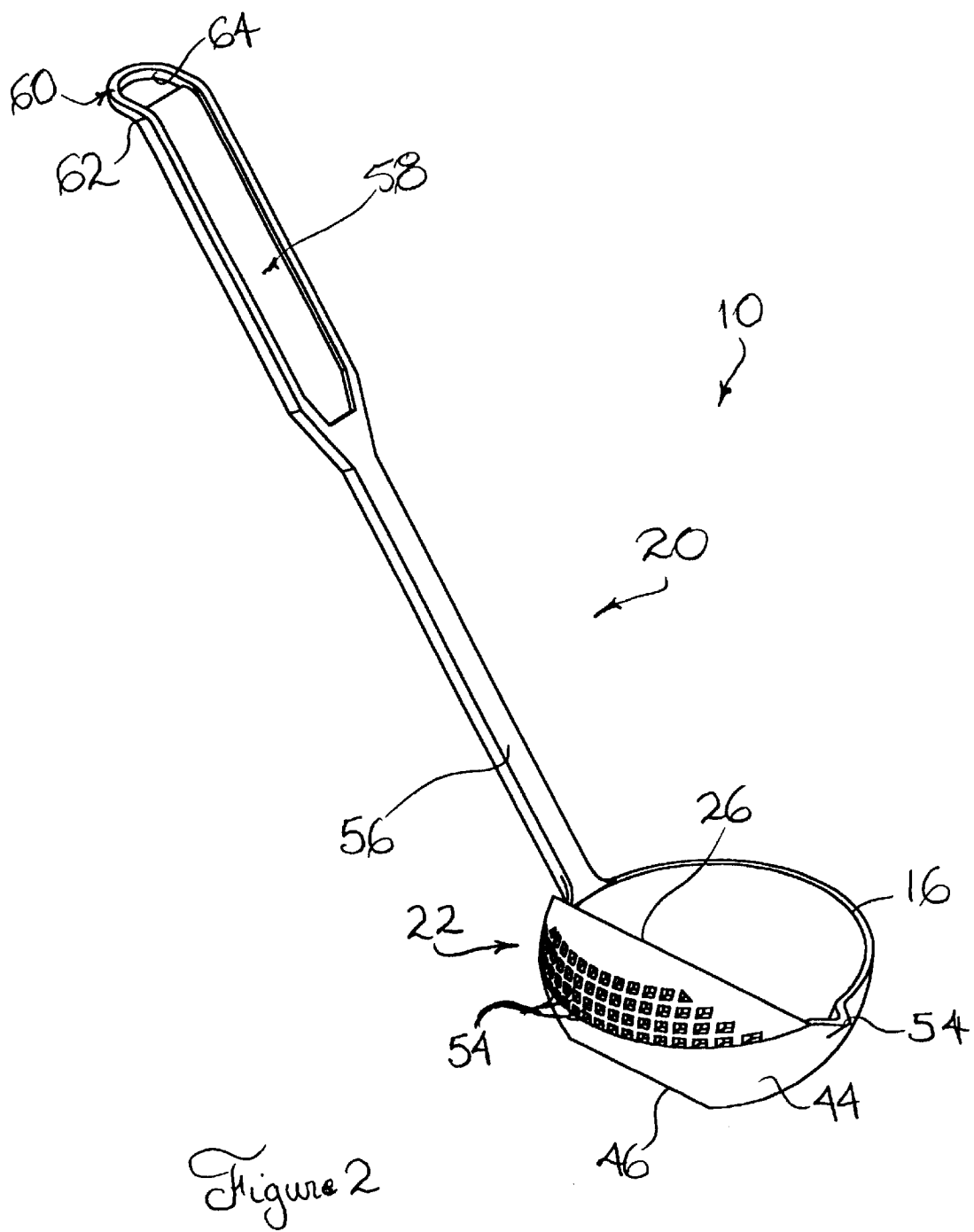
FIG. 2: in a rear perspective view, illustrates the sieving ladle shown in FIG. 1.

Referring to FIG. 1, there is shown a sieving ladle 10 in accordance with an embodiment of the present invention. The sieving ladle 10 includes a generally concave-shaped bowl 12. The bowl 12 defines a bowl wall 14 having a bowl wall peripheral edge 16. The bowl wall peripheral edge 16, in turn, defines an open main surface 18 extending therebetween. A handle 20 extends from the concave shaped bowl 12.

The sieving ladle 10 also includes a sieving wall 22. The sieving wall 22 defines a sieving wall proximal edge 24, a sieving wall distal edge 26, a sieving wall proximal segment 28 and a sieving wall distal segment 30. As shown more specifically in FIGS. 3 and 8, the sieving wall proximal segment 28 extends generally tangentially from a connecting section 32 of the wall peripheral edge 24. The sieving wall 22 has sieving apertures 34 extending therethrough.

As shown clearly in FIG. 3, the sieving wall 22 is curved inwardly in a direction generally indicated by the arrow 36 so that the sieving wall distal segment 30 extends in a generally overlying relationship relative to the open main surface 18 and to the concave shaped bowl 12 in general. The connecting section 32 typically has a generally curved configuration such that the sieving wall proximal segment 28 has a correspondingly shaped curved configuration generally indicated by arrow 38 in FIG. 4. The sieving wall proximal segment 28 thus has a generally rounded configuration curved about two distinct curving axis respectively generally indicated by the arrows 36 and 38. The sieving wall preferably has the overall general configuration of a rounded symmetrical section, part of a sphere.

The sieving wall distal edge 26 lies in a first intersecting geometrical plane schematically illustrated by the phantom line 40 in FIG. 3. The first intersecting geometrical plane 40 is in an angled relationship relative to the geometrical plane 42 of the open main surface 18.

The bowl wall 14 defines a main bowl wall section 44 and an auxiliary bowl wall section 46. The main bowl wall section 44 typically has a generally dome-shaped configuration while the auxiliary bowl wall section 46 typically has a generally flat configuration. Preferably, the main bowl wall section 44 has a generally hemi-spherical configuration while the auxiliary bowl wall section has a generally disk shaped configuration. The auxiliary bowl wall section 46 is typically positioned generally proximal the connecting section 32. As shown in FIG. 3, the intersection between the main bowl wall section 44 and the auxiliary wall section 46 preferably defines a relatively sharp intersection edge 48.

The auxiliary bowl wall section 46 extends in a second intersecting geometrical plane schematically illustrated in FIG. 3 by the phantom lines designated by the reference 50. The second intersecting geometrical plane 50 is preferably in a generally parallel relationship with the first intersecting geometrical plane 40. Typically, the first and second intersecting geometrical planes 40, 50 both form a plane angle 52 having a value substantially in the range of 45° with the geometrical plane 42 of the open main surface 18.

In a preferred embodiment of the invention shown in FIGS. 1 through 8, the bowl wall peripheral edge 16 has a generally annular shaped configuration. Alternatively, the bowl wall peripheral edge 16 could have other configurations such as a generally oval configuration without departing from the scope of the present invention. Preferably, the bowl peripheral edge 16 defines a pouring spout 54. The pouring spout is preferably positioned in a generally diametrically opposed relationship relative to the handle 20. The sieving wall proximal edge 32 preferably extends from a position adjacent the handle 20 to a position adjacent the pouring spout 54.

The handle 20 typically defines a proximal handle spacing segment 56 extending from the bowl 18 adjacent the bowl wall peripheral edge 16. A handle grasping segment 58 extends integrally and distally from the handle spacing segment 56. The handle grasping segment 58 is preferably provided with ergonomical features such as a widened grasping area provided with a textured surface so as to increase the friction coefficient thereof. A handle hooking segment 60 extends integrally from a distal end of the handle grasping segment 58. The handle spacing segment 56 preferably extends in a generally tangential relationship from the bowl wall 14 while the handle grasping segment 58 extends in a generally coaxial relationship with the handle spacing segment 56. The handle hooking segment 60 preferably extend in a generally parallel relationship with the geometrical plane 42 of the open main surface 18. The handle grasping segment 58 and the handle hooking segment 60 thus form a handle intersecting edge 62 therebetween adapted to be used for hooking the handle 20 to the peripheral edge of a cooking container. The handle hooking section 60 is preferably provided with a hooking aperture 64 extending therethrough.

Optionally, level indicating indicias (not shown) may be marked, formed or otherwise provided on the interior surface of the bowl wall 14. Preferably, the sieving wall proximal edge 24 ridges integrally with the connecting segment 32 and the entire sieving level is formed out of an integral piece of material manufactured out of a suitable manufacturing process such as an injection molding process using a conventional suitable material such as a polymeric resin.

In use, the sieving ladle is specifically designed to be used as a conventional ladle, as a strainer or a skimmer. When used as a strainer, the bowl 12 is filled through the open main surface 18 with the liquid-solid mixture to be sieved. The bowl 12 is then tilted so that the mixture flows through the sieving apertures 34 keeping the solids or coarse material inside the bowl 12 while allowing the liquids or fine particles to flow out of the ladle.

When used as a skimmer, the bowl 12 is initially tilted to a position illustrated in FIGS. 6 through 8 wherein the auxiliary bowl wall section 46 lies in a generally parallel relationship with the top surface of the solid-mixture to be skimmed. The bowl 12 is then lowered until the mixture is allowed to be sieved through the sieving apertures 34 allowing the liquid or finer particles to flow into the bowl while preventing the solids or coarse particles to flow thereunto. The positioning and the configuration of the auxiliary bowl wall section 46 combined with the configuration, size and positioning of the sieving wall 22 reduces the risks of having solids or coarse particles unwantingly flowing into the bowl 12. Indeed, not only does the auxiliary bowl wall section 46 provide a guiding means for ensuring adequate relative positioning between the bowl 12 and the top surface of the volume of mixture but it also allows for an optimal positioning of the sieving apertures 34 while reducing the buoyant force created by immersion of the bowl 12 within the volume of mixture.

Optionally, the relatively sharp intersection edge 48 between the main bowl section 44 and the auxiliary bowl section 46 can be used for scraping or severing purposes.

The pouring spout 54 is adapted to facilitate pouring of solid-liquid mixtures or liquids out of the bowl 12. Also, the intersection 62 between the grasping and hooking segments 58, 60 of the handle 20 can be used for releasably securing the sieving ladle 10 to the peripheral edge of a cooking container in abutment contact therewith when the ladle 10 is not in use. When the ladle 10 is stored, it can be easily hooked to conventional wall hooking structures extending through the hooking aperture 64. Optionally, an anti-skid texture can be formed on the grasping section 58 of the handle 20.

The embodiments of the invention in which an exclusive privilege or property is claimed are defined as follows:

1. A sieving ladle for allowing separation of solids or coarse material from liquids or fine particles, said sieving ladle having an interior and exterior and comprising:.
   a substantially concave-shaped bowl with respect to said interior of said ladle, said bowl defining a bowl wall, said bowl wall having a bowl wall peripheral edge, said bowl wall peripheral edge surrounding an open main surface;
   a handle extending from said concave-shaped bowl;
   a sieving wall, said sieving wall defining a sieving wall proximal edge, a sieving wall distal edge, a sieving wall proximal segment and a sieving wall distal segment, said sieving wall proximal segment extending substantially tangentially from a connecting section of said wall peripheral edge, said sieving wall having sieving apertures extending therethrough;
   said sieving wall being curved inwardly so that said sieving wall distal segment overlies said open main surface;
   said connecting section having a substantially curved configuration so that said sieving wall proximal segment has a substantially rounded configuration curved about two distinct curving axis;
   said sieving wall distal edge lying in a first intersecting geometrical plane, said first intersecting geometrical plane being in an angled relationship relative to said open main surface;
   said bowl wall defining a main bowl wall section and an auxiliary bowl wall section, said main bowl wall section having a substantially dome-shaped configuration, said auxiliary bowl wall section having a substantially flat configuration, said flat configuration being on both said interior and exterior of said ladle at the same corresponding location and spaced from said bowl wall peripheral edge;
   said auxiliary bowl wall section extending in a second intersecting geometrical plane, said second intersecting geometrical plane being in a substantially parallel relationship with said first intersecting geometrical plane.

2. A sieving ladle as recited in claim 1 wherein said first and second intersecting geometrical planes both form a plane angle having a value substantially in the range of 45 degrees with said open main surface.

3. A sieving ladle as recited in claim 1 wherein said bowl wall peripheral edge has a substantially circular configuration.

4. A sieving ladle as recited in claim 1 wherein said bowl wall peripheral edge has a substantially oval configuration.

5. A sieving ladle as recited in claim 1 wherein the intersection between said main bowl wall section and said auxiliary bowl wall section, defines an intersection edge, said intersection edge being configured and sized for acting as a severing means for severing food products.

6. A sieving ladle as recited in claim 1 wherein said main bowl wall section has a substantially hemi-spherical configuration.

7. A sieving ladle as recited in claim 1 wherein said auxiliary bowl wall section is positioned substantially proximal said connecting section.

8. A sieving ladle as recited in claim 1 wherein said bowl peripheral edge defines a pouring spout, said pouring spout being positioned in a substantially diametrically opposed relationship relative to said handle.

9. A sieving ladle as recited in claim 8 wherein said sieving wall proximal edge extends from a position adjacent said handle to a position adjacent said pouring spout.

10. A sieving ladle as recited in claim 1 wherein said sieving wall proximal edge merges integrally with said connecting section.

11. A sieving ladle as recited in claim 1 wherein said handle defines a proximal handle spacing segment extending from said bowl, a handle grasping segment extending integrally and distally from said handle spacing segment and a handle hooking segment extending integrally from a distal end of said handle grasping segment, said handle spacing segment extending substantially tangentially from said bowl wall, said handle grasping segment extending substantially in a coaxial relationship with said handle spacing segment and said handle hooking segment extending in a substantially parallel relationship with said open main surface.

12. A sieving ladle for allowing separation of solids or coarse material from liquids or fine particles, said sieving ladle having an interior and exterior and comprising:

a substantially concave-shaped bowl with respect to said interior of said ladle, said bowl defining a bowl wall, said bowl wall having a bowl wall peripheral edge, said bowl wall peripheral edge surrounding an open main surface;

a handle extending from said concave-shaped bowl;

a sieving wall, said sieving wall defining a sieving wall proximal edge, a sieving wall distal edge, a sieving wall proximal segment and a sieving wall distal segment, said sieving wall proximal segment extending substantially tangentially from a connecting section of said wall peripheral edge, said sieving wall having sieving apertures extending therethrough;

said sieving wall being curved inwardly so that said sieving wall distal segment overlies said open main surface;

said connecting section having a substantially curved configuration so that said sieving wall proximal segment has a substantially rounded configuration curved about two distinct curving axis;

said sieving wall distal edge lying in a first intersecting geometrical plane, said first intersecting geometrical plane being in an angled relationship relative to said open main surface;

said bowl wall defining a main bowl wall section and an auxiliary bowl wall section, said main bowl wall section having a substantially dome-shaped configuration, said auxiliary bowl wall section having a substantially flat configuration, said flat configuration being on both said interior and exterior of said ladle at the same corresponding location and spaced from said bowl peripheral edge;

the intersection between said main bowl wall section and said auxiliary bowl wall section defining an intersection edge, said intersection edge being configured and sized for acting as a scraping means for scraping food products.

13. A sieving ladle as recited in claim 12 wherein said intersection edge are configured and sized for acting as a severing means for severing food products.

14. A sieving ladle as recited in claim 12 wherein said bowl wall peripheral edge has a substantially circular configuration.

15. A sieving ladle as recited in claim 12 wherein said bowl wall peripheral edge has a substantially oval configuration.

16. A sieving ladle as recited in claim 12 wherein said main bowl wall section has a substantially hemi-spherical configuration.

17. A sieving ladle as recited in claim 12 wherein said auxiliary bowl wall section is positioned substantially proximal said connecting section.

18. A sieving ladle as recited in claim 12 wherein said bowl peripheral edge defines a pouring spout, said pouring spout being positioned in a substantially diametrically opposed relationship relative to said handle.

19. A sieving ladle as recited in claim 18 wherein said sieving wall proximal edge extends from a position adjacent said handle to a position adjacent said pouring spout.

* * * * *